Feb. 4, 1930.  G. B. FLENNER  1,745,922
ELECTRICAL GROUND ROD
Filed Sept. 16, 1927
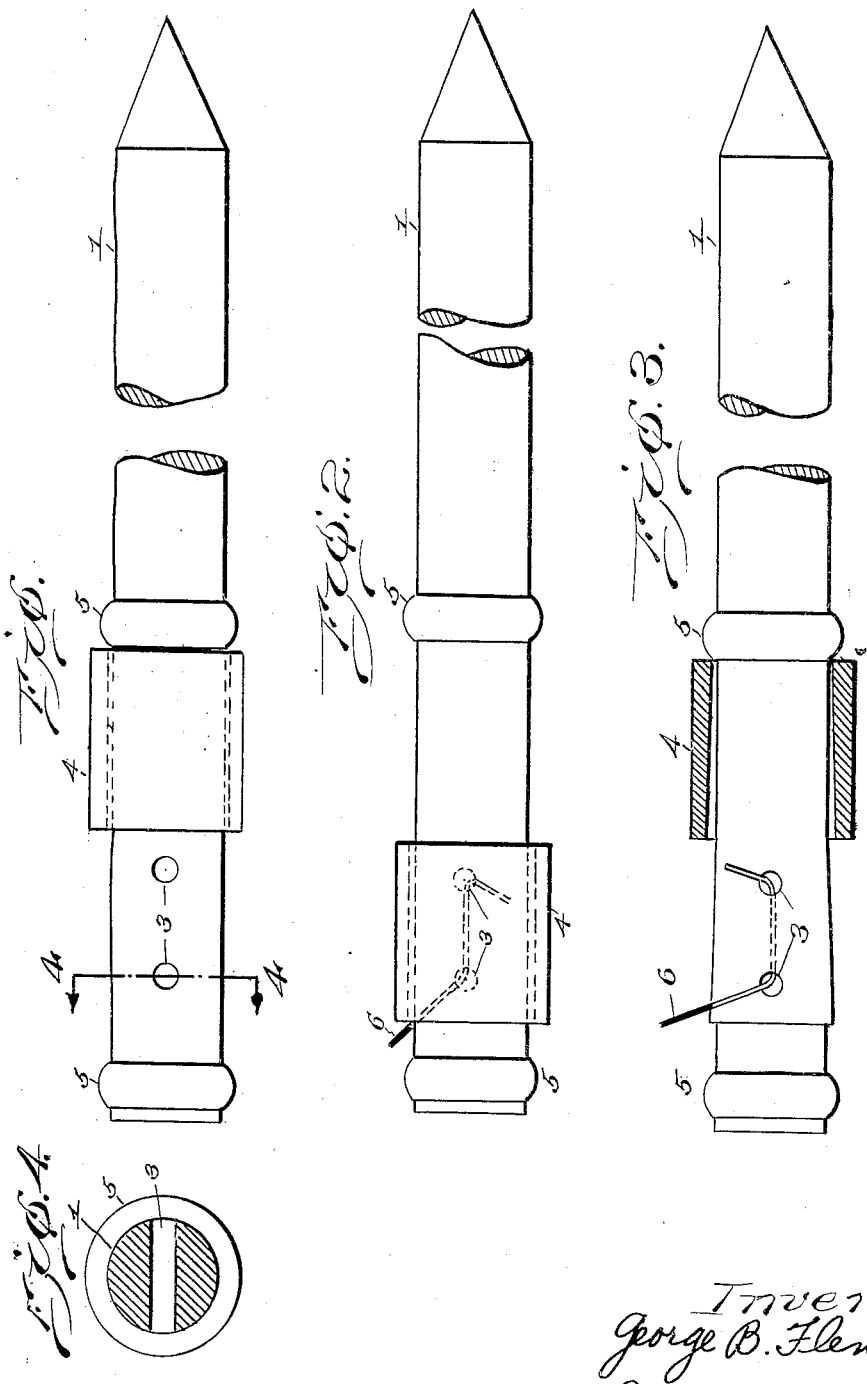

Patented Feb. 4, 1930

1,745,922

UNITED STATES PATENT OFFICE

GEORGE B. FLENNER, OF MANILA, PHILIPPINE ISLANDS

ELECTRICAL GROUND ROD

Application filed September 16, 1927. Serial No. 220,006.

This invention relates to new and useful improvements in electrical conductors, and has for its object the provision of a simple, durable, and efficient ground wire conductor, which is constructed of few parts inexpensively manufactured and easily assembled.

Another object is to provide such a conductor that the ground wire may be easily secured thereto or detached therefrom, and the ground wire be readily placed under the desired tension and securely held without the aid of solder or the like.

A further object is to provide a conductor of the nature above referred to which will allow the ready release of the ground wire when desired and the conductor used again.

With the foregoing and other objects in view, the invention consists in the combination of parts, and in the details of construction hereinafter set forth in the specification, certain embodiments thereof being illustrated in the accompanying drawings, in which:

Fig. 1 is a side elevation of the device without the wire attached.

Fig. 2 is a similar view showing in dotted lines the wire attached.

Fig. 3 is a view similar to Fig. 2 of a modification thereof in which the rod is tapered.

Fig. 4 is a section taken along line 4—4 of Fig. 1.

Referring more particularly to the drawings, the device consists of a tube or solid rod 1 on which a suitable sliding sleeve 4 is loosely mounted. The apertures 3 drilled through the rod permit the ground wire 6 to be passed through the rod in one direction and back through the opposite direction forming a hook or U-shaped appearance.

By passing a wire free from insulation through the apertures 3 and cutting of the free end long enough to permit bending at right angles to the rod, the sleeve 4 may be driven over the wire and a tight ground connection provided as shown in Fig. 2.

In order to provide a device of a unitary nature it is found preferable to cast two circular enlargements 5 spaced apart to retain the sleeve 4 and yet permit relative sliding movement thereof.

As shown in Fig. 3 the rod may be manufactured to taper in the direction of the normal top end of the rod. The sleeve 4 may also be provided with a corresponding taper on the inside surface so that when the wire is in place the sleeve may be driven down on the rod and effect a tight connection and permit the use of wires of different diameters. Solder in this instance as well as in the form shown in Fig. 1 is unnnecessary for the desired result.

This invention therefore overcomes the difficulties of design and operation accruing from the use of pigtails, twisted copper sleeve splices, soldered and taped connections, and further reduces to a minimum faulty ground connections and the labor and cost of installations.

Should the unnecessary precaution of a soldered connection be desired in the use of this invention it is but necessary to tin-coat the interior surface of sleeve 4 and the surface of the rod 1 adjacent the apertures 3, after which the sleeve is placed in proper position and heat applied augmented with the proper amount of solder. Due to their design and operation the ground rod may be reused even when treated with solder.

I claim:

1. A ground wire fastener comprising a rod with a plurality of apertures extending transversely therethrough to receive a ground wire threaded back and forth through said apertures, a sleeve slidably mounted on said rod and adapted to be wedged upon said apertured portion and engage said ground wire in secured relation.

2. A ground wire fastener comprising a rod with a plurality of apertures extending transversely therethrough to receive a ground wire threaded back and forth through said apertures and terminating in a free end bent to extend parallel to said rod, a sleeve slidably mounted on said rod and adapted to be wedged upon said apertured portion and engage said ground wire in secured relation.

3. A ground wire fastener comprising a rod with a plurality of apertures extending transversely therethrough to receive a ground wire threaded back and forth through said apertures and terminating in a free end bent to extend parallel to said rod, a sleeve slidably mounted on said rod and adapted to be wedged upon said apertured portion and engage said ground wire in secured relation, said rod being tapered at its apertured portion and said sleeve being correspondingly tapered.

4. A ground wire fastener comprising a rod with a plurality of apertures extending transversely therethrough to receive a ground wire threaded back and forth through said apertures and terminating in a free end bent to extend parallel to said rod, a sleeve slidably mounted on said rod and adapted to be wedged upon said apertured portion and engage said ground wire in secured relation, said rod being tapered at its apertured portion and said sleeve being correspondingly tapered, a pair of spaced enlargements on said rod for retaining said sleeve in sliding relation thereto.

In testimony whereof I affix my signature.

GEORGE B. FLENNER.